US011783524B2

(12) United States Patent
Vats

(10) Patent No.: US 11,783,524 B2
(45) Date of Patent: *Oct. 10, 2023

(54) PRODUCING REALISTIC TALKING FACE WITH EXPRESSION USING IMAGES TEXT AND VOICE

(71) Applicant: Nitin Vats, Bengaluru (IN)

(72) Inventor: Nitin Vats, Bengaluru (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/077,062

(22) PCT Filed: Feb. 10, 2017

(86) PCT No.: PCT/IB2017/050752
§ 371 (c)(1),
(2) Date: Aug. 10, 2018

(87) PCT Pub. No.: WO2017/137947
PCT Pub. Date: Aug. 17, 2017

(65) Prior Publication Data
US 2019/0197755 A1 Jun. 27, 2019

(30) Foreign Application Priority Data
Feb. 10, 2016 (IN) .......................... 2582/DEL/2015

(51) Int. Cl.
*G06T 13/40* (2011.01)
*G10L 21/10* (2013.01)
(Continued)

(52) U.S. Cl.
CPC ............ *G06T 13/40* (2013.01); *G06T 13/205* (2013.01); *G06T 13/80* (2013.01); *G10L 2021/105* (2013.01)

(58) Field of Classification Search
CPC ........... G10L 2021/105; G06T 2210/44; G06T 2213/00–12
See application file for complete search history.

(56) References Cited

U.S. PATENT DOCUMENTS 5,826,234 A * 10/1998 Lyberg .................... G10L 13/02
704/E21.02
5,990,901 A * 11/1999 Lawton .................. G06T 11/60
345/581

(Continued)

OTHER PUBLICATIONS

Wang et al., ("High Quality Lip-Sync Animation for 3D Photo-Realistic Talking Head"), 2012 (Year: 2012).*

(Continued)

*Primary Examiner* — Phong X Nguyen
(74) *Attorney, Agent, or Firm* — Crose Law LLC; Bradley D. Crose

(57) ABSTRACT

A method for providing visual sequences using one or more images comprising:

receiving one or more person images of showing at least one face, receiving a message to be enacted by the person, wherein the message comprises at least a text or a emotional and movement command, processing the message to extract or receive an audio data related to voice of the person, and a facial movement data related to expression to be carried on face of the person, processing the image/s, the audio data, and the facial movement data, and generating an animation of the person enacting the message.

Wherein emotional and movement command is a GUI or multimedia based instruction to invoke the generation of facial expression/s and or body part/s movement.

15 Claims, 14 Drawing Sheets

(51) Int. Cl.
  *G06T 13/80* (2011.01)
  *G06T 13/20* (2011.01)

(56) References Cited

U.S. PATENT DOCUMENTS

| | | | | |
|---|---|---|---|---|
| 6,232,965 | B1* | 5/2001 | Scott | G06T 13/40 704/E21.02 |
| 6,250,928 | B1* | 6/2001 | Poggio | G09B 19/04 434/167 |
| 6,661,418 | B1* | 12/2003 | McMillan | G06T 13/205 704/E21.02 |
| 6,766,299 | B1* | 7/2004 | Bellomo | G10L 21/10 704/E21.02 |
| 7,386,799 | B1* | 6/2008 | Clanton | A63F 13/12 715/861 |
| 9,479,736 | B1* | 10/2016 | Karakotsios | H04N 7/157 |
| 9,548,048 | B1* | 1/2017 | Solh | G06V 40/20 |
| 2002/0194006 | A1* | 12/2002 | Challapali | G06T 13/40 704/276 |
| 2004/0068408 | A1* | 4/2004 | Qian | G10L 21/06 704/E21.02 |
| 2005/0042591 | A1* | 2/2005 | Bloom | G11B 27/34 434/308 |
| 2006/0251384 | A1* | 11/2006 | Vronay | H04N 7/15 386/280 |
| 2006/0290699 | A1* | 12/2006 | Dimtrva | H04N 21/4341 345/473 |
| 2007/0216675 | A1* | 9/2007 | Sun | G06T 11/00 348/51 |
| 2007/0230794 | A1* | 10/2007 | McAlpine | G06T 11/60 382/190 |
| 2008/0019576 | A1* | 1/2008 | Senftner | G06T 15/00 382/118 |
| 2008/0163074 | A1* | 7/2008 | Tu | G10L 13/08 715/758 |
| 2008/0221904 | A1* | 9/2008 | Cosatto | G10L 13/00 704/276 |
| 2009/0010544 | A1* | 1/2009 | Li | G06V 40/171 382/190 |
| 2010/0082345 | A1* | 4/2010 | Wang | G10L 13/00 704/E21.02 |
| 2011/0216153 | A1* | 9/2011 | Tasker | H04N 7/15 348/E7.083 |
| 2012/0069028 | A1* | 3/2012 | Bouguerra | H04N 7/157 345/473 |
| 2014/0019137 | A1* | 1/2014 | Kitagishi | G10L 13/04 704/260 |
| 2015/0084950 | A1* | 3/2015 | Li | G06T 7/251 345/419 |
| 2015/0161809 | A1* | 6/2015 | Murdock | G06F 3/0304 345/474 |
| 2015/0287403 | A1* | 10/2015 | Holzer Zaslansky | G06T 13/205 704/231 |
| 2016/0134840 | A1* | 5/2016 | McCulloch | G06V 40/165 348/14.03 |
| 2017/0018088 | A1* | 1/2017 | Jeong | G06T 17/10 |
| 2017/0039750 | A1* | 2/2017 | Tong | G06T 13/40 |
| 2018/0082461 | A1* | 3/2018 | Bonansea | H04L 51/10 |
| 2022/0264243 | A1* | 8/2022 | Lyren | H04M 1/7243 |

OTHER PUBLICATIONS

Afifi et al. ("Video Face Replacement System Using a Modified Poisson Blending Technique", 2014) (Year: 2014).*
Wang et al., HMM trajectory-guided sample selection for photo-realistic talking head, 2015 (Year: 2015).*
Fan et al., A deep bidirectional LSTM approach for video-realistic talking head, 2015 (Year: 2015).*
Cosatto et al., Photo-Realistic Talking-Heads from Image Samples, 2000 (Year: 2000).*

* cited by examiner

User Face Views

Video Frames of Celebrity

Modified Video

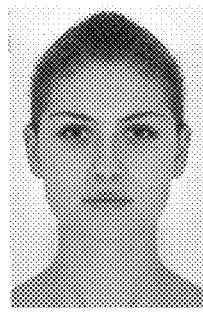
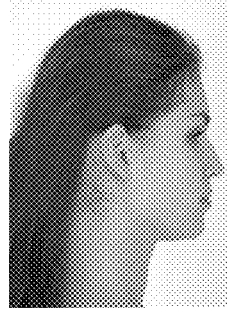
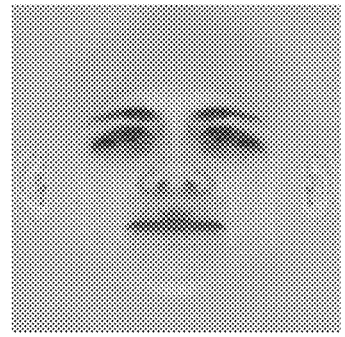
FIG. 9 (a)　　　FIG. 9(b)　　　FIG. 9 (c)
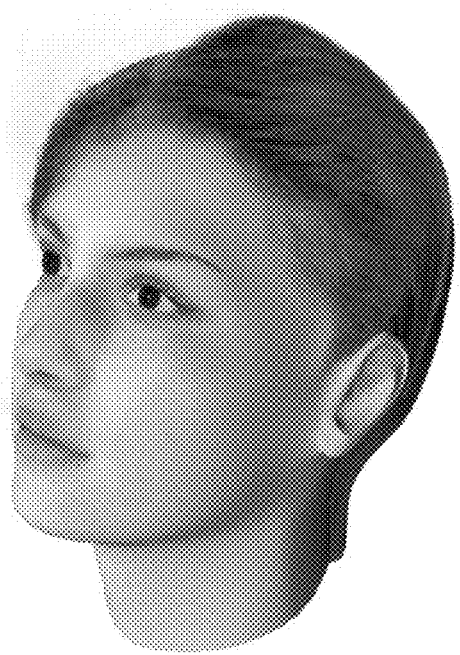
FIG. 10 (a)　　　FIG. 10 (b)

PRODUCING REALISTIC TALKING FACE WITH EXPRESSION USING IMAGES TEXT AND VOICE

FIELD OF THE INVENTION

The invention relates to processing faces, present in images according to input text and/or audio to provide with realistic animations with lipsing, facial expressions and voice

BACKGROUND

Video and animation when stored requires a huge amount of memory with respect to images, audio or text. Even for transmission of videos or animation requirement of network bandwidth is high in comparison to image, audio or text. However, at the same time, the clarity of information is well delivered when it is received by the receiver as a video or animation rather than text, audio or images.

In current scenario, video chatting over mobile network or video messaging suffer from lag in timing due to bandwidth crunch and there is no solution available for quality video chatting on low bandwidth network.

One possible way to deal with this scenarios, is to compress the video and then transmit the compressed video and animations. Some known compression techniques for videos are MPEG-1, MPEG-2, MPEG-4, H.263, H.264, H.265, etc. However, most of the video compression techniques are lossy compressions. Such lossy compressions substantially reduce the information rendered, which affects quality of information received by the receiver or the viewer. AT the same time, if lossless compression techniques are used, than the compression of data is insubstantial and still required high data storage for storing the data or high bandwidth for transmitting the data.

Another possible way for dealing with bandwidth crunch, is to divide a video into network packets and then transmit the video as network packets over the network. However, such transmission for real-time video viewing required high network speed and also this scenario is limited only for transmission of video and not to the storage of video.

Sometimes, user do not want to go live himself in a video chat, due to an unsuitable surrounding environment or an unsuitable physical getup of the user, hence a solution is required where a video chat shall be possible, however without switching on user's camera.

OBJECT OF THE INVENTION

The object of the invention is to provide realistic viewing experience of an information, while still keeping the storage and bandwidth requirement for the information low.

SUMMARY OF THE INVENTION

The object of the invention is achieved by a method of claim 1.

According to one embodiment of the method, the method includes:
   receiving one or more person images of showing at least one face,
   receiving a message to be enacted by the person, wherein the message comprises at least a text or a emotional and movement command,
   processing the message to extract or receive an audio data related to voice of the person, and a facial movement data related to expression to be carried on face of the person,
   processing the image/s, the audio data, and the facial movement data, and generating an animation of the person enacting the message.

Wherein emotional and movement command is a GUI or multimedia based instruction to invoke the generation of facial expression/s and or body part/s movement.

According to another embodiment of the method, wherein the message is received as an input from a user.

According to yet another embodiment of the method, wherein the message comprises the audio data.

According to one embodiment of the method, wherein the message comprises a body movement instruction related to movement of body part/s of the person.

According to another embodiment of the method, the method includes:
   processing at least one of the message and the audio data to producing a lipsing data;
   processing, the image/s, the audio data, the facial movement data, the lisping data and generating an animation of the person enacting the message with lipsing.

According to yet another embodiment of the method, wherein the image/s comprises faces of more than one person, the method includes:
   receiving the messages to be enacted by the person in an order,
   processing the messages to extract or receive the audio data related to voice of the persons, and the facial movement data related to expressions to be carried on faces of the persons,
   processing, the image/s, the audio data, and the facial movement data, and generating an animation of the person enacting the messages in the respective order as provided.

According to one embodiment of the method, the method includes:
   receiving a selection input to select one or more person with face/s from the image/s received,
   generating a scene image showing one or more one or more person with face/s based on the selection input,
   processing, the scene image, the audio data, and the facial movement data, and generating an animation of the persons enacting the message.

According to another embodiment of the method, the method includes:
   receiving a chat request made by an user with at least one another user,
   establishing a chat environment between the users based on the chat request,
   receiving at least one image representative of at least one of the users, wherein the image comprising at least one face,
   receiving a message from at least one of the users in the chat environment, wherein the message comprises at least a text or an emotional and movement command.

According to yet another embodiment of the method, wherein the message from a first computing device is received at a second computing device, and processing the image/s, the audio data, and the facial movement data, and generating an animation of the person enacting the message in the chat environment.

According to one embodiment of the method, the method includes:

receiving at least one image representative of more than one users in the chat environment, processing the image/s, and generating a scene image showing the users in the chat environment, processing the scene image, the audio data, and the facial movement data, and generating an animation of the persons enacting the message in the chat environment.

According to another embodiment of the method, the method includes:

receiving a wearing input related to a body part of at least one of the person in the image/s onto which a fashion accessory is to be worn;

processing the wearing input and identifying body part/s of the person onto which the fashion accessory is to be worn;

receiving an image/video of the accessory according to the wearing input;

processing the identified body part/s the person and the image/video of the accessory and generating a wearing image showing the person wearing the fashion accessory, processing the wearing image, the audio data, and the facial movement data, and generating an animation of the persons enacting the message wearing the fashion accessory.

According to yet another embodiment of the method, the method includes:

receiving a target image showing a face of another person or animal, processing the person image/s and the target image to generate a morphed image showing the face from the target image on the person's body from the person image, processing the morphed image, the audio data, and the facial movement data, and generating an animation of the persons enacting the message.

According to one embodiment of the method, the method includes:

receiving a target image/video showing a body of another person or toon or animal, processing the person image/s, the target image/video the audio data, and the facial movement data, and generating an animation of the person with body from target image/video enacting the message.

According to another embodiment of the method, the method is being implemented in a video call environment between at least two callers without using video camera by at least one of the users, the method includes:

receiving an image of the caller who is not using the video camera, receiving a message to be enacted by the caller, wherein the message comprises at least the text or the emotional and movement command, processing the message to extract or receive an audio data related to voice of the person, and a facial movement data related to expression to be carried on face of the person, processing the image, the audio data, and the facial movement data, and generating an animation of the caller enacting the message.

Wherein emotional and movement command is a GUI or multimedia based instruction to invoke the generation of facial expression/s and or body part/s movement.

BRIEF DISCUSSION OF THE DRAWINGS

FIG. 1 illustrates a schematics of inputs and outputs as per one embodiment of the invention.

FIG. 2a-d illustrates exemplary expressions generated onto a face.

FIG. 7(a)-(c) illustrates an example of applying body movement and facial expression on an image 701.

FIG. 8(a)-FIG. 8(b) illustrates the points showing facial feature on user face determined by processing the image using trained model to extract facial feature and segmentation of face parts for producing facial expressions while FIG. 8(c)-(f) shows different facial expression on user face produced by processing the user face.

FIG. 9(a)-(c) illustrates the user input of front and side image and face unwrap.

Figure 11:
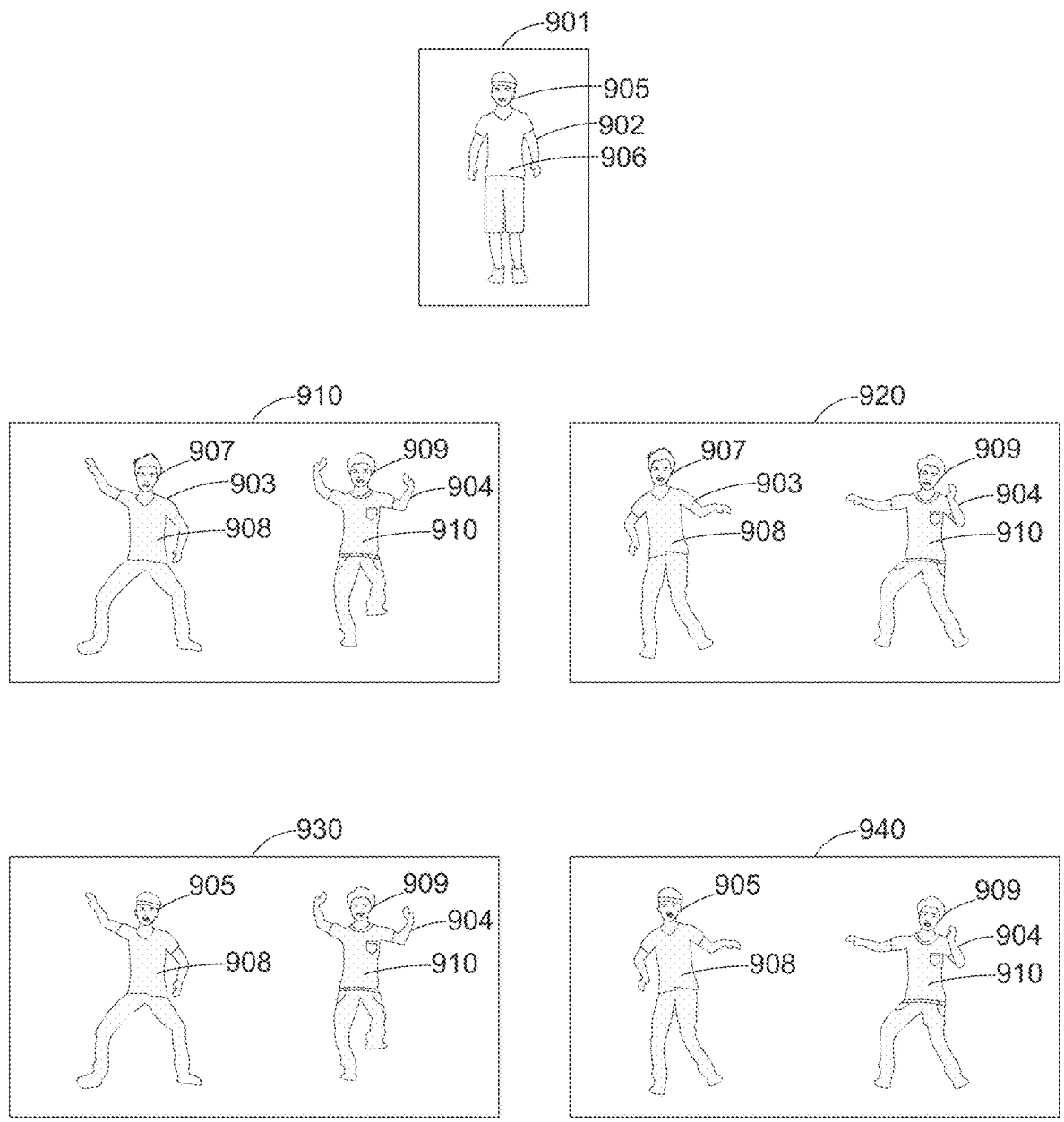

FIG. 10(a)-FIG. 10(b) illustrates the face generated in different angle and orientation by generated 3d model of user face FIG. 11 illustrates an example of creating a movie scene by replacing a first face part in a body of a first character presented in a video with a second face part of a second character, and further creating different facial expressions too of the second face of second character different with the first face of the first character in a particular video frame.

Figure 12:
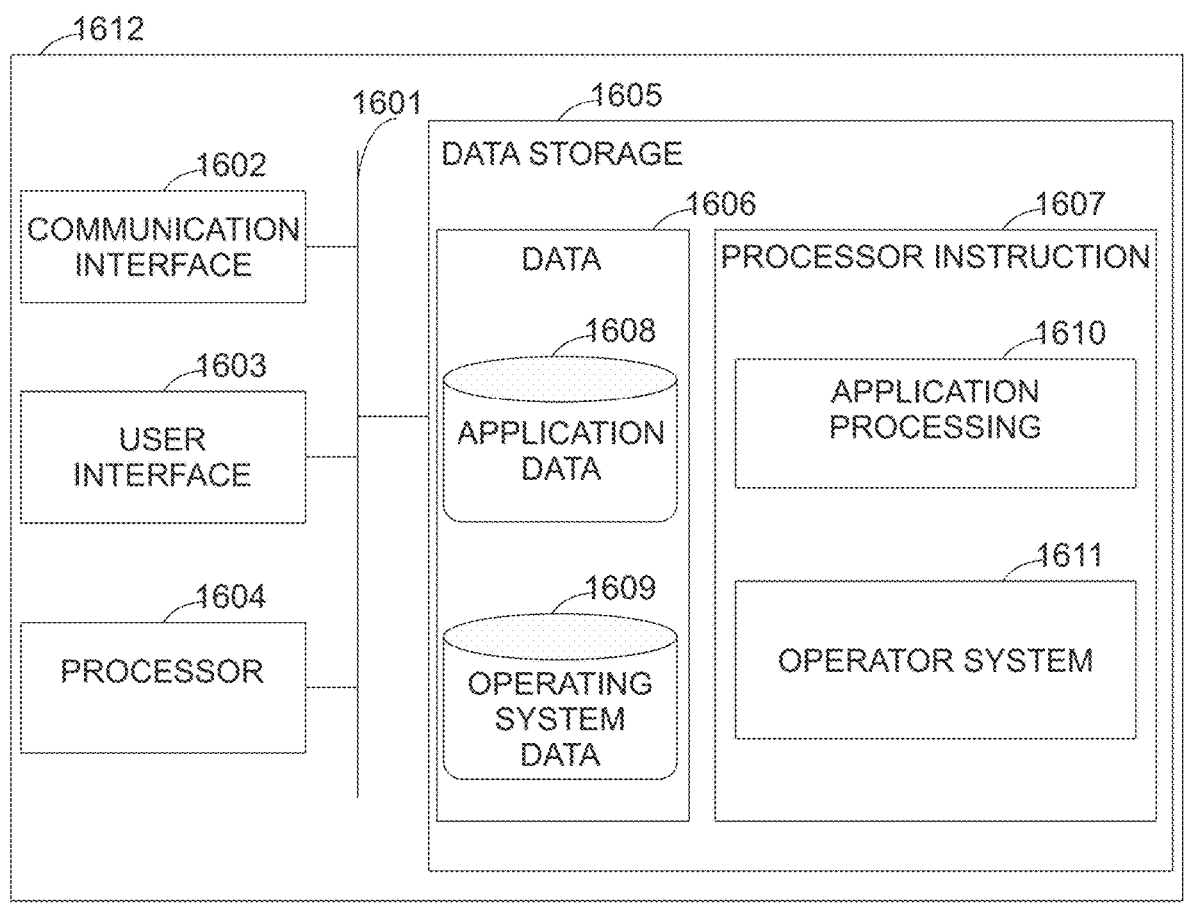

FIG. 12 shows the system diagram.

Figure 13:
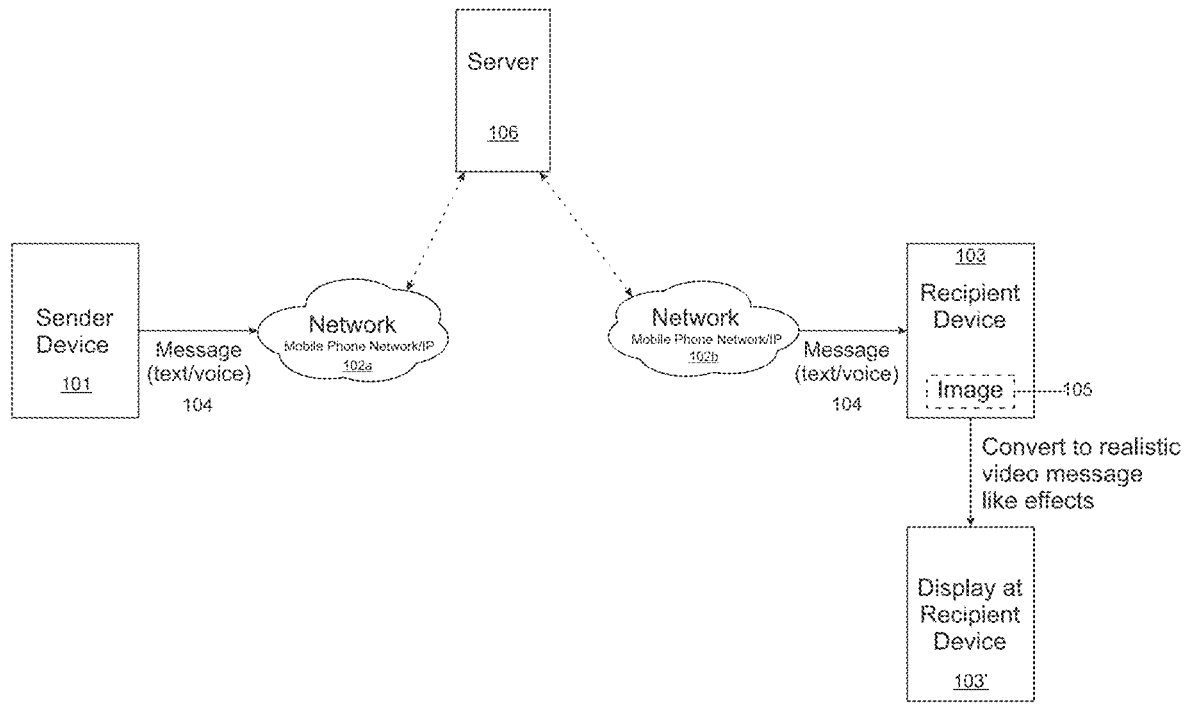

FIG. 13 illustrate the device connected to the network.

Figure 14:
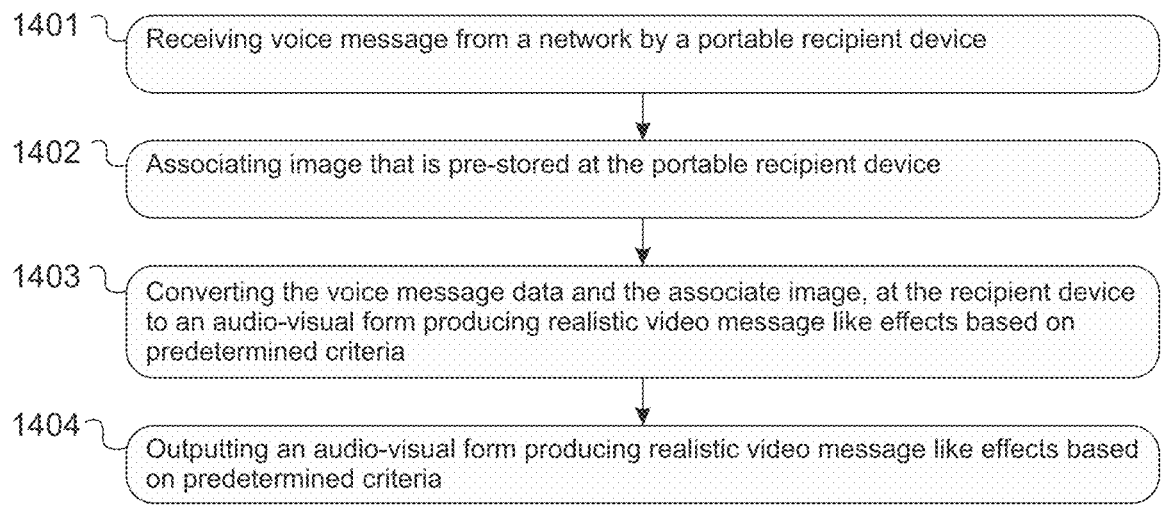

FIG. 14 illustrate an embodiment of present invention.

Figure 15:
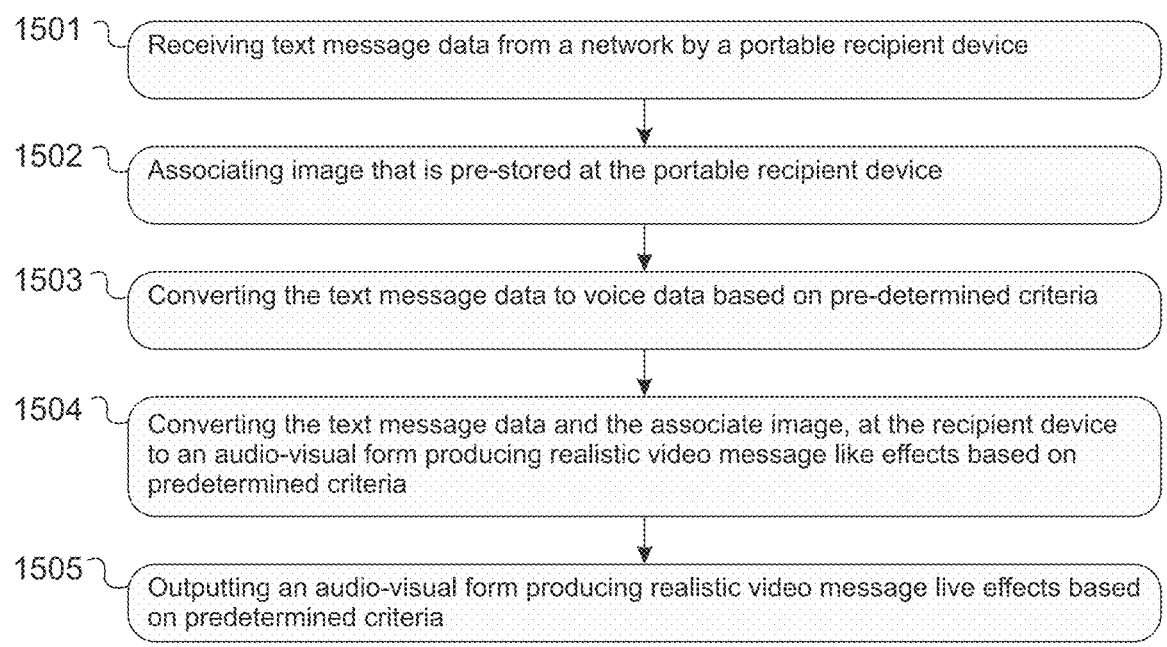

FIG. 15 illustrate an embodiment of present invention.

Figure 16:
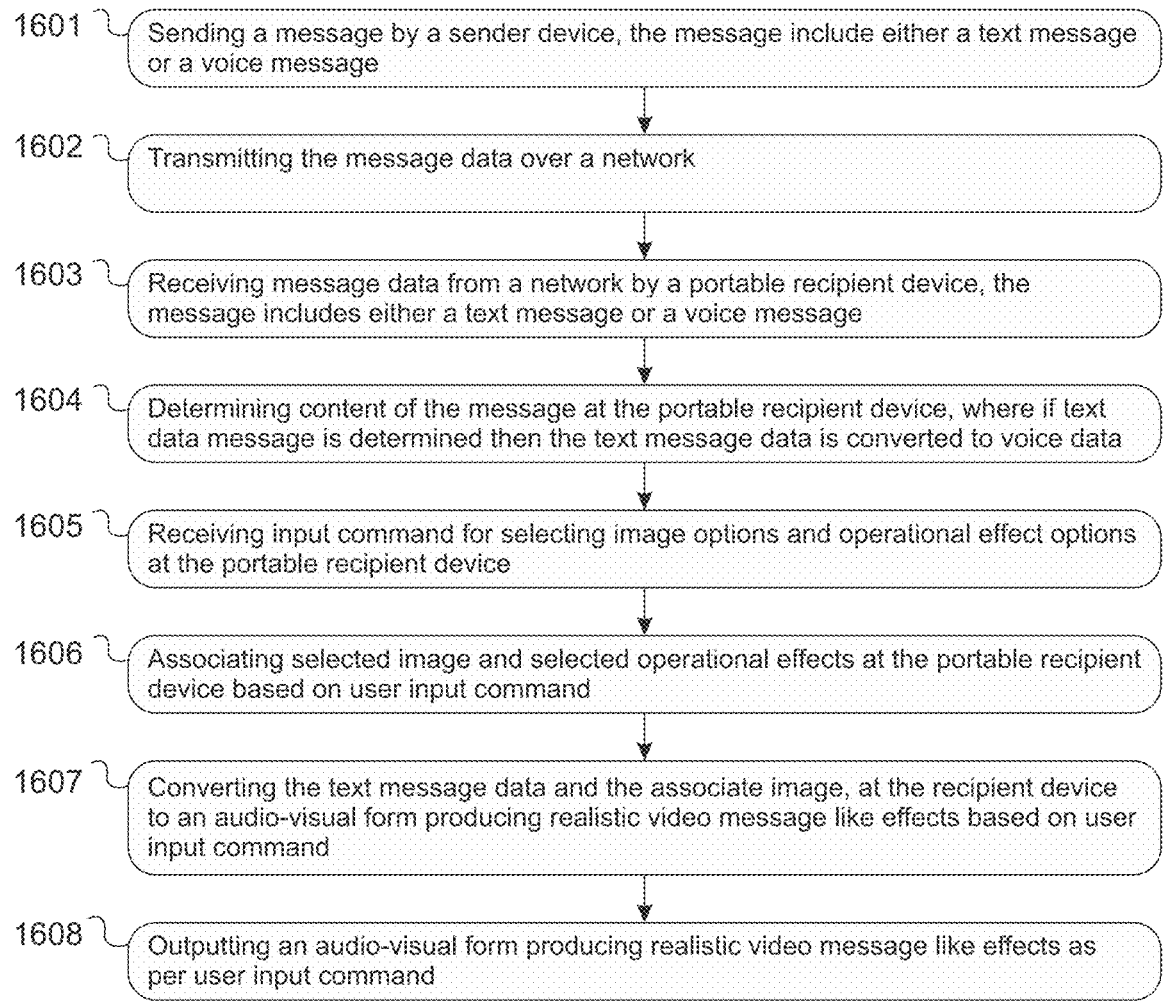

FIG. 16 illustrate an embodiment of present invention.

Figure 17:
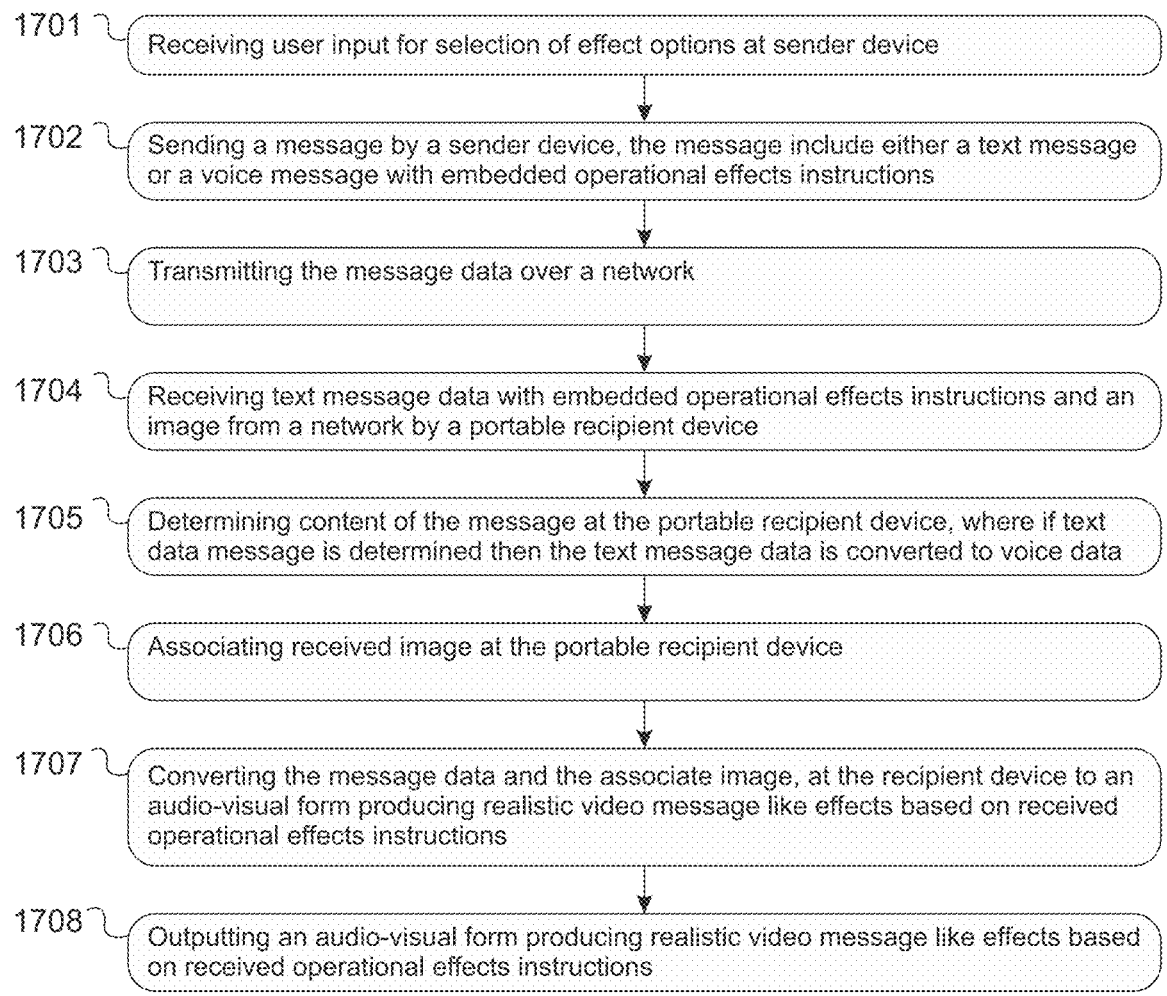

FIG. 17 illustrate an embodiment of present invention.

DETAILED DESCRIPTION

In one embodiment of the invention, following components are used to implement the features of the invention:

Input data comprising image/video which comprises the face of a person, Emotion & movement command, video, text or audio or combination thereof. The emotion & movement command may be smiley, text, symbol or any other kind of input for showing mood expression on face or body part or combination thereof and output is animated message, chat or live video call experience.

The Database include, Database for image processing, Database for user information and relationship, Supporting Libraries.

Database for image processing includes Images, images of user having face, pre rigged images of user, 3D model of user, videos/animations. Trained model data which is generated by training with lots of faces/body and help in quickly extracting facial and body features, Video/animation with predefined face location, image/video of animation of other characters, Images related to makeup, clothing accessories.

Database for user information and relationship includes, user profile data, relationship with various other users, interest in activities/group.

Supporting Libraries includes one or more libraries described as follows; facial feature extraction trained model, skeleton information extraction model, tool to create animation in face/body part/s by trigger of Emotion & movement command, it may be smiley, text, symbol at client device, animation generation engine, skeleton animation generation engine, facial feature recognition engine, skeleton information extraction engine, text to voice conversion engine, voice learning engine from set of voice samples to convert voice of text in user, image morphing engine, lipsing & facial expression generation engine based on input voice, face orientation and expression finding engine form a given video, Facial orientation recognition and matching model, model for extracting facial features/lipsing from live video, tool to wrap or resize the makeup/clothing accessories images as per the face in the image, 3D face/body generation engine from images.

In one embodiment;
A method for providing visual sequences using one or more images comprising:
receiving one or more person images of showing at least one face,
receiving a message to be enacted by the person, wherein the message comprises at least a text or a emotional and movement command,
processing the message to extract or receive an audio data related to voice of the person, and a facial movement data related to expression to be carried on face of the person,
processing the image/s, the audio data, and the facial movement data, and generating an animation of the person enacting the message.

Wherein emotional and movement command is a guide or multimedia based instruction to invoke the generation of facial expression/s and or body part/s movement.

The display for rendering the output can be a wearable display or a non-wearable display or combination thereof.

The non-wearable display includes electronic visual displays such as LCD, LED, Plasma, OLED, video wall, box shaped display or display made of more than one electronic visual display or projector based or combination thereof.

The non-wearable display also includes a pepper's ghost based display with one or more faces made up of transparent inclined foil/screen illuminated by projector/s and/or electronic display/s wherein projector and/or electronic display showing different image of same virtual object rendered with different camera angle at different faces of pepper's ghost based display giving an illusion of a virtual object placed at one places whose different sides are viewable through different face of display based on pepper's ghost technology.

The wearable display includes head mounted display. The head mount display includes either one or two small displays with lenses and semi-transparent mirrors embedded in a helmet, eyeglasses or visor. The display units are miniaturized and may include CRT, LCDs, Liquid crystal on silicon (LCos), or OLED or multiple micro-displays to increase total resolution and field of view.

The head mounted display also includes a see through head mount display or optical head-mounted display with one or two display for one or both eyes which further comprises curved mirror based display or waveguide based display. See through head mount display are transparent or semitransparent display which shows the 3d model in front of users eye/s while user can also see the environment around him as well.

The head mounted display also includes video see through head mount display or immersive head mount display for fully 3D viewing by feeding rendering of same view with two slightly different perspective to make a complete 3D viewing. Immersive head mount display shows output in virtual environment which is immersive.

In one embodiment, the output moves relative to movement of a wearer of the head-mount display in such a way to give to give an illusion of output to be intact at one place while other sides of 3D model are available to be viewed and interacted by the wearer of head mount display by moving around intact 3D model.

The display also includes a volumetric display to display the output and interaction in three physical dimensions space, create 3-D imagery via the emission, scattering, beam splitter or through illumination from well-defined regions in three dimensional space, the volumetric 3-D displays are either auto stereoscopic or auto multiscopic to create 3-D imagery visible to an unaided eye, the volumetric display further comprises holographic and highly multiview displays displaying the 3D model by projecting a three-dimensional light field within a volume.

In one embodiment, the aspects of invention are implemented by a method using following steps:
Receiving an image having a face (in any orientation) and a input data including a text and/or Emotion & movement command and/or voice
If the text is provided as input, converting the text into a voice
Lipsing the image according to voice data received as input or the voice generated from the text data and accordingly generating facial expression. If smiley is provided as input data, the facial expressions are generated using a pre-determined expression based on the smiley
Sender can also choose makeup, add clothing accessories in image
Rendering a video having the face and lipsing with voice along with the facial expression and or with makeup/clothing accessories.
This can be used for sending message, live chat and posting on social networking site.

In an alternate embodiment, the aspects of invention are implemented by a method using following steps:
Receiving and selecting an image and/or video of a first character, which can be a person or animal or cartoon, receiving a desired face of a second character from different angles which is to be exchanged, and a input data including voice and/or text;
If the text is provided in spite of voice, converting text into a voice;
In case of a video is received, removing the face of the first character in the video, in desired length of the video which is sufficient for voice message;
Exchanging the desired face on original image or video of the body of first character and applying lipsing according to voice data received as input or the voice generated from the text data;
Render the video.

In another alternate embodiment, the aspects of invention are implemented by a method using following steps:
Receiving and selecting an image and/or video of a first character whose face is being exchanged with face of second character, receiving a face of a second character from different orientations, up-down, left-right positions and angles, which is to be exchanged, and a input data including voice and/or text;
Breaking the video in different frames and removing the face of selected character from the video;

Exchanging the face of first character with face of the second character in each frame to generate a new frame, provided that the particular orientation of the face of first character should be morphed with face of the second character in similar orientation;

Applying lipsing by extracting lipsing of the first character in each frame of original video and applying same lipsing in each new frame onto face of the second character; or Applying lipsing by extracting voice of the first character in original video and lipsing the new video frames according to voice;

Generating the final video from frames as output.

In another alternate embodiment, the aspects of invention are implemented by a method using following steps:

Sending voice message and/or text message and/or smiley from a first mobile device to a second mobile device;

Receiving the voice message and/or text message and/or smiley on the second mobile device;

If message is just text then converting it in voice message processing the pre-selected image of second mobile with voice In another alternate embodiment, the aspects of invention are implemented by a method using following steps:

Sending voice message and/or text message and/or smiley and/or optionally chosen image from a first mobile device to a second mobile device;

Receiving the voice message and/or text message and/or smiley on server device;

If message is just text then converting it in voice message on server

In case first mobile send image then processing that image else processing the image which is stored by second mobile for such messages on server, with voice sending the video message to second mobile.

In another alternate embodiment, the aspects of invention are implemented by a method using following steps:

Opening up a chat window of a profile holder showing an image and text box for writing a text and/or sending a voice;

The user connected through network enter a text and/or his voice in the chat window;

The text and/or the voice entered by the online user is processed to be matched with a suitable answer from a form data filled by the profile holder.

Processing the answer with lipsing and or facial expression using database and different engines to generate an output Displaying the output video as answer to the question on chat window Chat may be done in a common environment which means that both of chatting partner will be shown in one environment.

In another alternate embodiment, the aspects of invention are implemented by a method using following steps:

Opening up a call window of a profile holder showing an image/video of user;

The voice of the user is transmitted to another person on call;

User optionally also transfer Emotion & movement command

The voice generate lipsing on the image shown at receiver end and optionally show expression on face.

The same happened from the side of receiver end to user end

Alternatively camera on user device capture the video of user and its lipsing is extracted and transferred to generate realistic lipsing at receiver end.

Call may be done in a common environment which means that both of chatting partner will be shown in one environment.

In all above embodiment apart from facial expression emotion and movement command can be given for body/body part movement.

There Exist Various Methods for Face detection which are based on either of skin tone based segmentation, Feature based detection, template matching or Neural Network based detection. For example; Seminal work of Viola Jones based on Haar features is generally used in many face detection libraries for quick face detection.

Haar Feature is define as follows:

Lets consider a term "Integral image" which is similar to the summed area table and contains entries for each location such that entry on (x, y) location is the sum of all pixel values above and left to this location.

$$ii(x, y) = \sum_{x' \leq x, y' \leq y} i(x', y')$$

where ii(x, y) is the integral image and i(x, y) is original image.

Integral image allows the features (in this method Haar-like-features are used) used by this detector to be computed very quickly. The sum of the pixels which lie within the white rectangles are subtracted from the sum of pixels in the grey rectangles. Using integral image, only six array reference are needed to compute two rectangle features, eight array references for three rectangle features etc which let features to be computed in constant time O(1).

After extracting Feature, The learning algorithm is used to select a small number of critical visual features from a very large set of potential features Such Methods use only few important features from large set of features after learning result using Learning algorithm and cascading of classifiers make this real time face detection system.

In realistic scenario users upload pies which are in different orientation and angels. For such cases, Neural Network based face detection algorithms can be used which leverage the high capacity of convolution networks for classification and feature extraction to learn a single classifier for detecting faces from multiple views and positions. To obtain the final face detector, a Sliding window approach is used because it has less complexity and is independent of extra modules such as selective search. First, the fully connected layers are converted into convolution layers by reshaping layer parameters. This made it possible to efficiently run the Convolution Neural Network on images of any size and obtain a heat-map of the face classifier.

Once we have a detected the face, the next is to find the location of different facial features (e.g. corners of the eyes, eyebrows, and the mouth, the tip of the nose etc) accurately.

For an Example, to precisely estimate the position of facial landmarks in a computationally efficient way, one can use dlib library to extract facial features or landmark points.

Some methods are based on utilizing a cascade of regressors. The cascade of regressors can be defined as follows:

Let $x_i \in R^2$ be the x, y-coordinates of the ith facial landmark in an image I. Then the vector $S=(x_1^T, x_2^T, \ldots, x_p^T)^T \in R^{2p}$ denotes the coordinates of all the p facial landmarks in I. The vector S represent the shape. Each regressor, in the cascade predicts an update vector from the image. On Learning each regressor in the cascade, feature points estimated at different levels of the cascade are initialized with the mean shape which is centered at the output of a basic Viola & Jones face detector.

Thereafter, extracted feature points can be used in expression analysis and generation of geometry-driven photorealistic facial expression synthesis.

For applying makeup on lips, one need to identify lips region in face. For this, after getting facial feature points, a smooth Bezier curve is obtained which captures almost whole lip region in input image. Also, Lip detection can be achieved by color based segmentation methods based on color information. The facial feature detection methods give some facial feature points (x, y coordinates) in all cases invariant to different light, illumination, race and face pose. These points cover lip region. However, drawing smart Bezier curves will capture the whole region of lips using facial feature points.

Generally Various Human skin tone lies in a particular range of hue and saturation in HSB color space (Hue, Saturation, and Brightness). In most scenario only the brightness part varies for different skin tone, in a range of hue and saturation. Under certain lighting conditions, color is orientation invariant. The studies show that in spite of different skin color of the different race, age, sex, this difference is mainly concentrated in brightness and different people's skin color distributions have clustering in the color space removed brightness. In spite of RGB color space, HSV or YCbCr color space is used for skin color based segmentation.

Merging, Blending or Stitching of images are techniques of combining two or more images in such a way that joining area or seam do not appear in the processed image. A very basic technique of image blending is linear blending to combine or merge two images into one image: A parameter X is used in the joining area (or overlapping region) of both images. Output pixel value in the joining region:

$$P_{Joining\_Region}(i,j)=(1-X)*P_{First\_Image}(i,j)+X*P_{Second\_Image}(i,j).$$

Where 0<X<1, remaining region of images are remain unchanged.

Other Techniques such as 'Poisson Image Editing (Perez et al.)', 'Seamless Stitching of Images Based on a Haar Wavelet 2d Integration Method (Ioana et al.)' or 'Alignment and Mosaicking of Non-Overlapping Images (Yair et al.)' can be used for blending.

For achieving life-like facial animation various techniques are being used now-a day's which includes performance-driven techniques, statistical appearance models or others. To implement performance-driven techniques approach, feature points are located on the face of an uploaded image provided by user and the displacement of these feature points over time is used either to update the vertex locations of a polygonal model, or are mapped to an underlying muscle-based model.

Given the feature point positions of a facial expression, to compute the corresponding expression image, one possibility would be to use some mechanism such as physical simulation to figure out the geometric deformations for each point on the face, and then render the resulting surface. Given a set of example expressions, one can generate photorealistic facial expressions through convex combination. Let $E_i=(G_i, I_i)$, i=0, . . . m, be the example expressions where $G_i$ represents the geometry and IR is the texture image. We assume that all the texture images $I_i$ are pixel aligned. Let $H(E_0, E_1, \ldots, E_m)$ be the set of all possible convex combinations of these examples. Then $$H(E_0, E_1, \ldots, E_m) = \left\{ \left( \sum_{i=0}^{m} c_i G_i, \sum_{i=0}^{m} c_i I_i \right) \middle| \sum_{i=0}^{m} c_i = 1, c_i \geq 0, i = 0, \ldots, m \right\}$$

While the statistical appearance models are generated by combining a model of shape variation with a model of texture variation. The texture is defined as the pattern of intensities or colors across an image patch. To build a model, it requires a training set of annotated images where corresponding points have been marked on each example. The main techniques used to apply facial animation to a character includes morph targets animation, bone driven animation, texture-based animation (2D or 3D), and physiological models.

User will be able to chat with other users when they are offline on not willing to chat with that particular user. It is a computer program which conducts a conversation via auditory or textual methods. Such programs are often designed to convincingly simulate how a human would behave as a conversational partner, thereby passing the Turing test.

This program may use either sophisticated natural language processing systems, or some simpler systems which scan for keywords within the input, and pull a reply with the most matching keywords, or the most similar wording pattern, from a database. There are two main types of programs, one functions based on a set of rules, and the other more advanced version uses artificial intelligence. The programs based on rules, tend to be limited in functionality, and are as smart as they are programmed to be. On the other end, programs that use artificial intelligence, understands language, not just commands, and continuously gets smarter as it learns from conversations it has with people. Deep Learning techniques can be used for both retrieval-based and generative models, but research seems to be moving into the generative direction. Deep Learning architectures like Sequence to Sequence are uniquely suited for generating text. Few example includes Retrieval-based models which use a repository of predefined responses and some kind of heuristic to pick an appropriate response based on the input and context. The heuristic could be as simple as a rule-based expression match, or as complex as an ensemble of Machine Learning classifiers. These systems don't generate any new text, they just pick a response from a fixed set while other such as Generative models don't rely on pre-defined responses. They generate new responses from scratch. Generative models are typically based on Machine Translation techniques, but instead of translating from one language to another, we "translate" from an input to an output (response).

User can use image or 3D character to represent himself or herself. This should be able to express different facial poster, neck movement and body movement. It is always easy to give body moment using skeleton animation.

Skeletal animation is a technique in computer animation in which a character (or other articulated object) is represented in two parts: a surface representation used to draw the character (called skin or mesh) and a hierarchical set of interconnected bones (called the skeleton or rig) used to animate the mesh Rigging is making our characters able to move. The process of rigging is we take that digital sculpture, and we start building the skeleton, the muscles, and we attach the skin to the character, and we also create a set of animation controls, which our animators use to push and pull the body around. While Setting up a character to walk and talk is the last stage before the process of character animation can begin. This stage is called 'rigging and skinning' and is the underlying system that drives the movement of a character to bring it to life. Rigging is the process to setting up a controllable skeleton for the character that is intended for animation. Depending on the subject matter, every rig is unique and so is the corresponding set of controls.

Skinning is the process of attaching the 3D model (skin) to the rigged skeleton so that the 3D model can be manipulated by the controls of the rig. In case of 2D character, 2D mesh is generated on which the character image is linked and the bones are attached to different points giving it, degree of freedom to move the character's body part/s. Animate a character can be produced with predefined controllers in rigging to move, scale and rotate in different angels and directions for realistic feel as to show a real character in computer graphics.

The feature extraction model recognizes a face, shoulders, elbows, hands, a waist, knees, and feet from the user shape, it extracts feature points with respect to the face, both shoulders, a chest, both elbows, both hands, the waist, both knees, and both feet. Accordingly, the user skeleton may be generated by connecting the feature points extracted from the user shape. In general, the skeleton may be generated by recognizing many markers attached on a lot of portions of a user and extracting the recognized markers as feature points. However, in the exemplary embodiment, the feature points may be extracted by processing the user shape within the user image by an image processing method, and thus the skeleton may easily be generated.

The extractor, extracts feature points with respect to eyes, a nose, an upper lip center, a lower lip center, both ends of lips, and a center of a contact portion between the upper and lower lips. Accordingly, a user face skeleton may be generated by connecting the feature points extracted from the user face. If the user face skeleton extracted from the user image is animated to generate animated user image/virtual model.

The invention is further explained through various illustrations.

Figure 1:
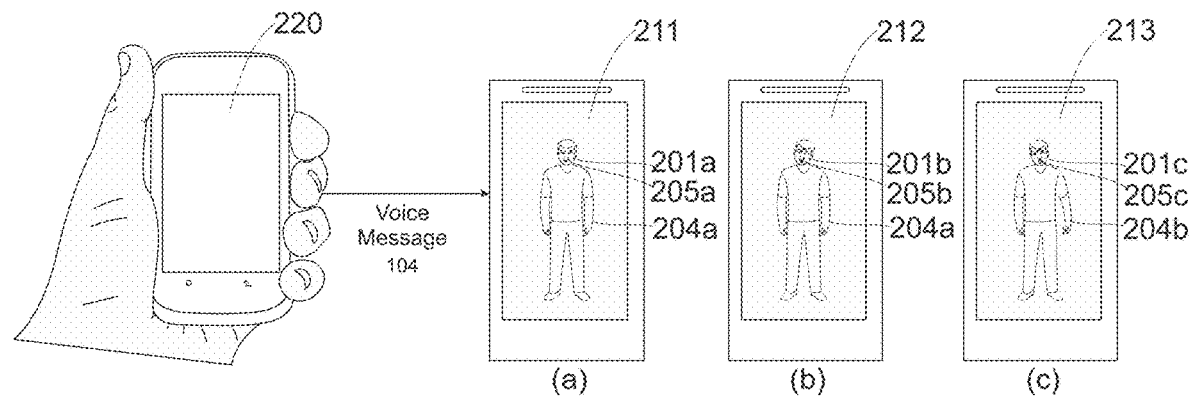

In FIG. 1, shows an image 210 and a voice message 220 as input, and frames 211, 212 and 213 as outputs. The system syncs the voice message 220 with the image 210 to generate three frames 211, 212, 213. Video frames 211, 212, 213 shows movement of lips from position 205a to 205c, movement of head from position 201a to 201c, while the voice output is synchronized with lips movement.

The face regions includes forehead region, nose region, cheek region, lips and region surrounding lips. The system is configured to recognize the face regions from the image. The diction of the voice message is synchronized not only to lips but also to region surrounding lips and other face regions and body parts such that a realistic video message like effects is generated instantly. The synchronization is carried out either according to predetermined criteria or based on operational instructions obtained by user input. The operational instructions are produced when user provides input for selecting video effect options. The video effect options may include moods or emotions selection such as happy, anger, normal, smiling or tension moods or emotions, face morphing in image, face morphing in video, selecting or tagging characters when the image contains multiple characters to set speaking order for tagged characters.

Figure 2:
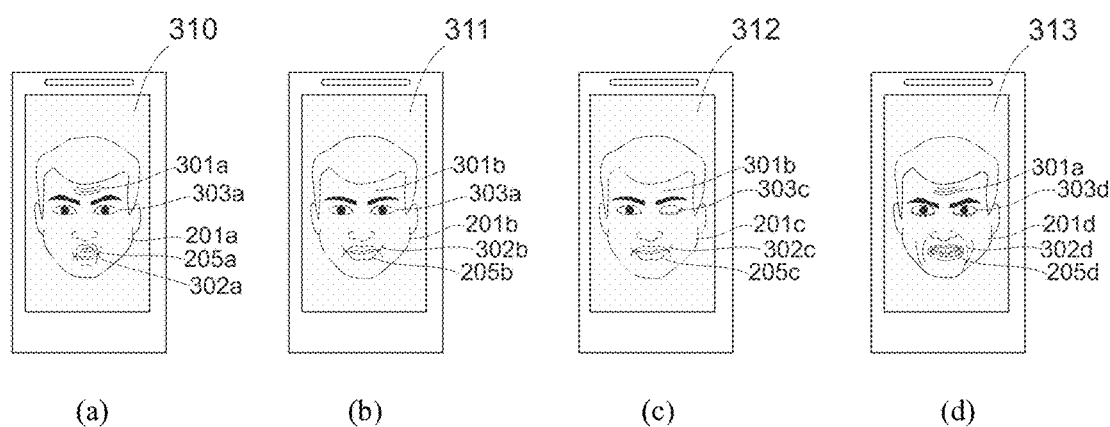

FIG. 2 exemplary expressions generated onto face through four video frames 310, 311, 312, 313. Video frame 310 illustrates opening of lips 205a as per syllable of spoken word of the voice message. The forehead region 301a is folded and the region surrounding the lips 302a is also synchronized as per the syllable of spoken word of the voice message providing realistic expression of scolding. The expression may change during diction of words of the voice message as per syllable of spoken word and pauses between words and sentences. Video frame 311 shows slight opening of lips 205b synchronized as per syllable of spoken word of the voice message. Accordingly, the region surrounding the lip 302b, cheek region 201b, eye region 303a, and forehead region 301b is also synchronized as per the lips movement and as per syllable of spoken word of the voice message providing realistic expression of being in normal mood. During utterance of a mischievous word, or when user selects an effect option of mood selection, face regions are synchronized according to operational instructions obtained as a result of user input for selection of particular mood option. Video frame 312 shows one eye closed 303c, relaxed forehead region 301b, stretched region surrounding lips 302c, and cheek region 201c, all synchronized to the lips movement and as per syllable of spoken word of the voice message providing realistic expression of being in mischievous mood. Similarly, video frame 313 shows effect of an angry mood depicted by synchronized facial regions, such as folded forehead region 301a, highly stretched region 302d surrounding the lips, widely open lips with teeth 205d, stretched cheek region 201d and broad eye 303d, during diction of words of the voice message. Generally lips movement is as per voice input i.e. lips and also the surrounding region move as per the input syllable while the mood on face is introduced by input smiley. Smiley may be for facial expression, body movement or may be both actions therefore.

Figure 3:
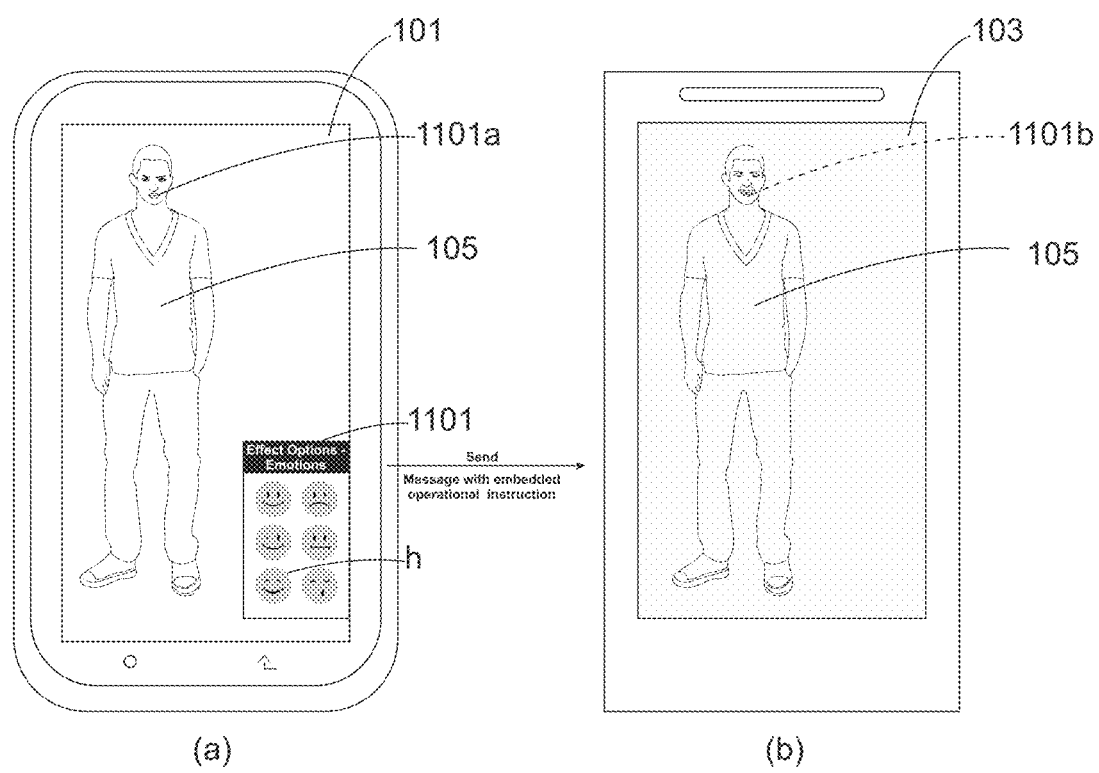
FIG. 3 illustrates an example of generating facial expressions relating to a particular emotions or mood using symbolic of those emotions or moods.

FIG. 3 illustrates an example of generating facial expressions relating to a particular emotions or mood using symbolic of those emotions or moods. A sender may select a particular smiley from a set 1101 of effect options of smiley, such as happy (h) at the sender device 101 for choosing emotion to be displayed at the recipient device 103 while sending a text message or voice message. The application program preferably instead of sending the smiley or emotions or any video attachment embeds operational instructions of happy emotion selection while delivering the message to the recipient device 103. The message with embedded operational instruction is automatically converted at the recipient device using the senders image 105 also pre-stored at recipient device 103 to a form producing video message like effects based on the operational instruction of mood selection by sender. The movement of face regions including lip movement are synchronized as per the syllable of word of the message with voice output. Same can be seen as change in lips movement from 1101a to 1101b. A realistic happy emotion is displayed on the facial regions of the image 105 at the recipient device 103 during diction of words of the received message.

Figure 4:
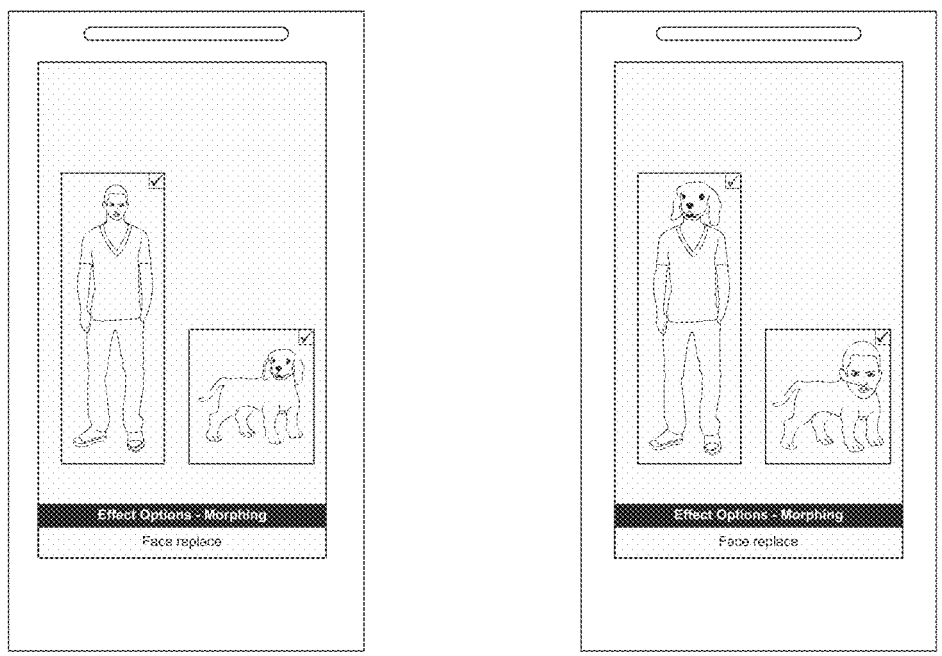
FIG. 4 illustrates an example of face morphing in an image and then providing facial expressions.

The user can also select two images and select effect option of face morphing in image to swap faces in selected photographs as shown in FIG. 4. The selection automatically produces operational instructions which are embedded in the message. The user may send message data with morphed image/changed image to the recipient. The operational instructions are also embedded in the message for the recipient device to act as per the operational instruction, where an audio-visual form producing effects of video message is outputted at the recipient device, where the received morphed/changed/replaced image speaks the message with synchronized facial regions and lips movement creating illusion of a video message.

Figure 5:
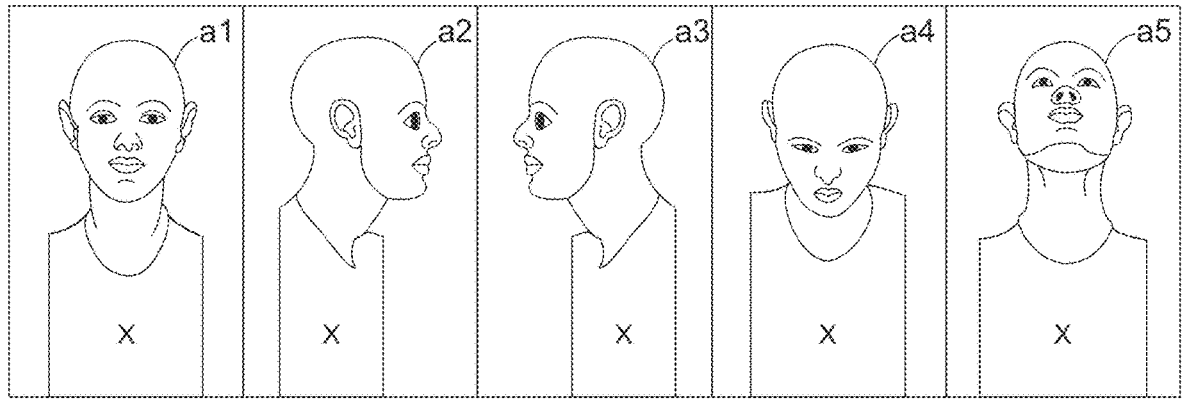
FIG. 5 illustrates an example of face morphing in a video by replacing faces in the videos and retaining same facial expressions which were present on the face of un-morphed video.
Figure 5:
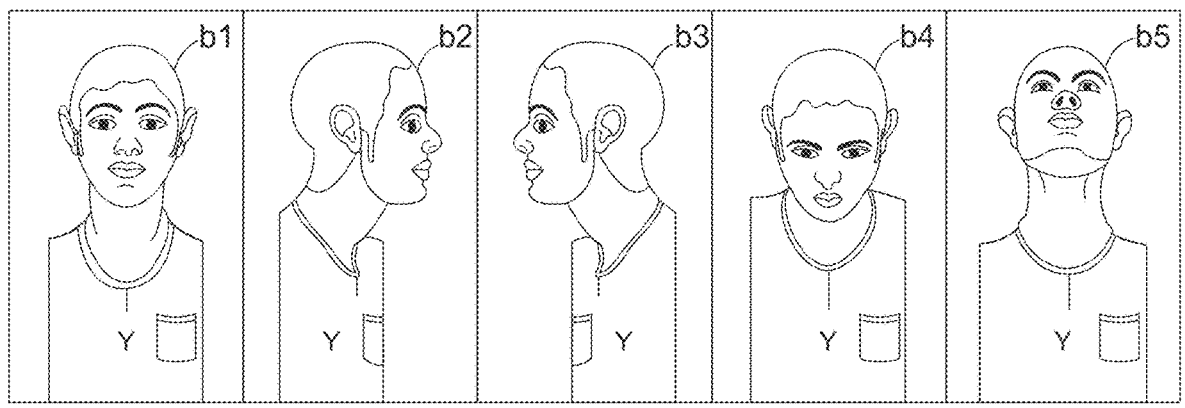
Figure 5:
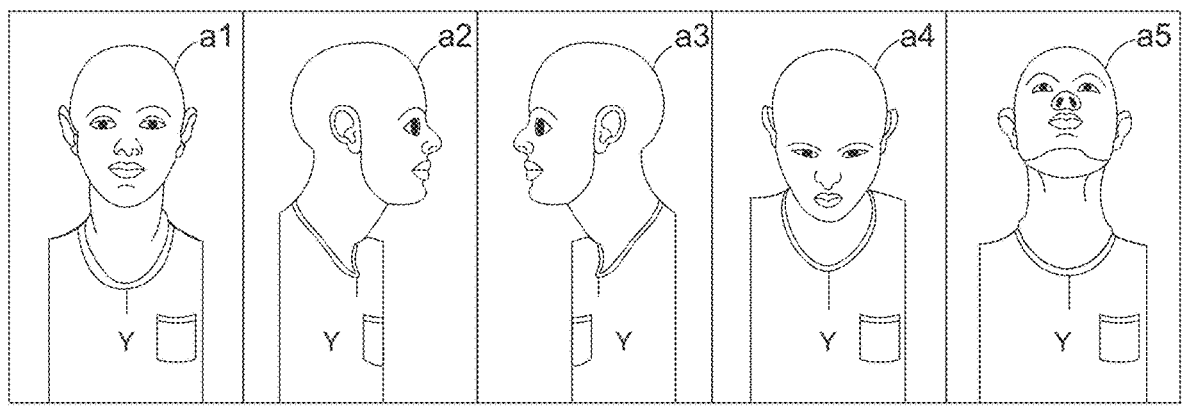

FIG. 5 illustrates an example of face morphing in a video by replacing faces in the videos and retaining same facial expressions which were present on the face of un-morphed video. A user (X) may capture photographs of his face from different field of view such as front view a1, side views a2, a3, top view a4 and bottom view a5. The system enables the user to select a video from a video library, and edit the video using an effect option of face morphing in video. A human character such as celebrity's face in video may be selected and the effect option of face morphing in video may be applied to replace the celebrity's face in the video by the face of user automatically. An operational instruction is produced which gets embedded in the text or voice message sent by sender device instead of modified video. However, an audio-visual form producing effect of video message is outputted at the recipient device. The effect includes displaying modified video, where both facial regions and lips movement of user face are seen synchronized with the message data, while the other body movements are same as of original video.

Figure 6:
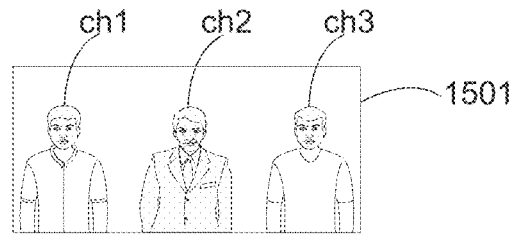
FIG. 6 illustrates an example for tagging characters when the image contains multiple characters to set speaking order for tagged characters video for producing video message like effects as per user input.
Figure 6:
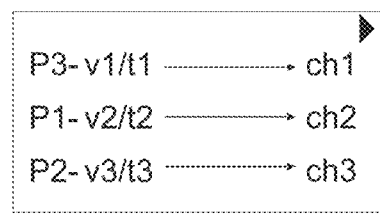
Figure 6:
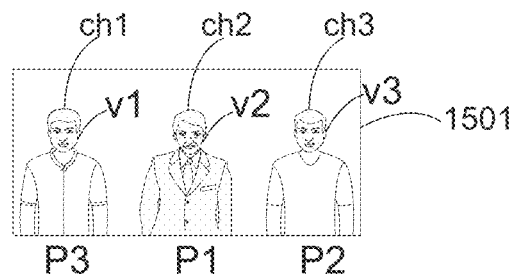

FIG. 6 illustrates example selection of effect options for tagging characters when the image contains multiple characters to set speaking order for tagged characters video for producing video like effect. An image or photograph 1501 containing multiple human (ch1,ch2,ch3) or animal characters may be tagged by user with text message or voice message. A first voice message (v1) or text message (t1) may be assigned to first human character ch1, a second voice message (v2) or text message (t2) may be assigned to second human character ch2, and a third voice message (v3) or text message (t3) may be assigned to third human character ch3 using a Graphical User Interface of the application program. Speaking order priority (P1, P2, P3) may be set to selected characters (ch1,ch2,ch3) in desired order to make a particular character speak as per set order as shown in FIG. 6. Speaking order may be in sequential or in parallel at the same time. The selections and settings automatically produce operational instructions which get embedded in the text or voice message with attached image. The image converts into video message as per operational instructions. The conversion can happen on sender user device or at servers or at recipient device or partially at them to produce video message. The recipient user can hear the second human character ch2 speak the second voice message v2 first while visualizing movements on facial regions including lips movements of second character ch2, all synchronized to spoken words of the second voice message v2. This is followed by speaking of third human character ch3 while visualizing movements on facial regions including lips movements of the third human character ch2, where all movements on the third human character ch3 are synchronized to spoken words of the third voice message v3. And as per the operational instruction, at the end of execution of the third voice message v3, speaking of first human character ch1 resumes while movements are visualized on facial regions including lips movement of the first human character ch1.

In one embodiment, user can use an image and add to animation as described to different persons in the image and can share it on social media. In an another embodiment, sender user can just transfer all settings such as text/voice message, their ordering and command for expression (such as smiley) which is very light data and this will produce animation at recipient device using the image of persons.

Figure 7:
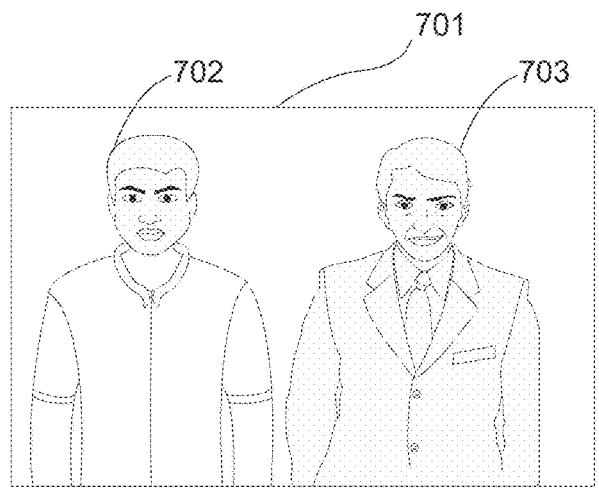
Figure 7:
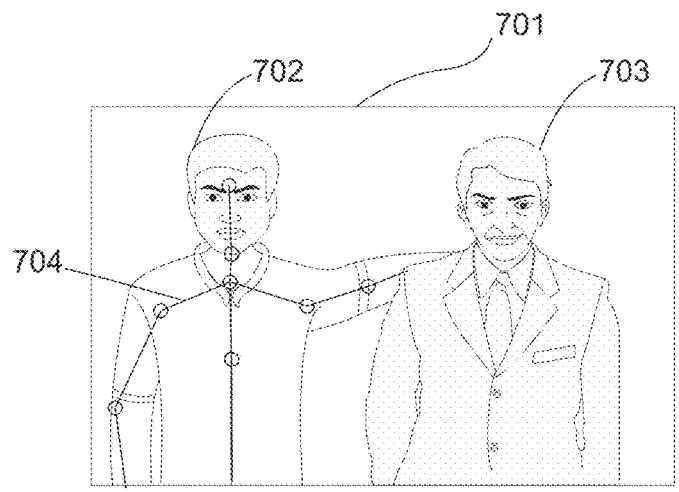
Figure 7:
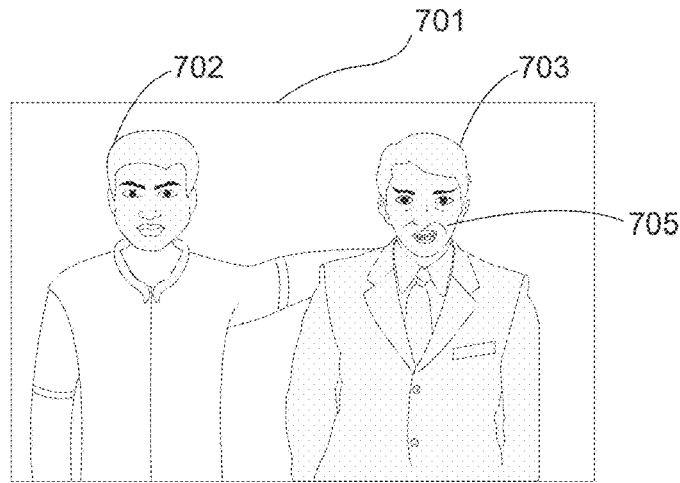

FIG. 7 illustrate an example of applying body movement and facial expression on an image 701 which shows two persons 702 and 703 in FIG. 7(a). FIG. 7(b) shows the extracting of skeleton data 704 on the body of the person 702 and the hand of 702 comes on the shoulder of 703. In FIG. 7(c) shows the expression 705 on the face of person 703.

Figure 8:
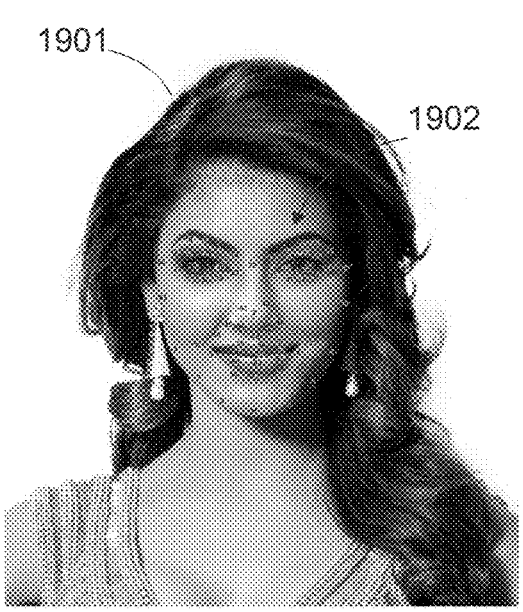
Figure 8:
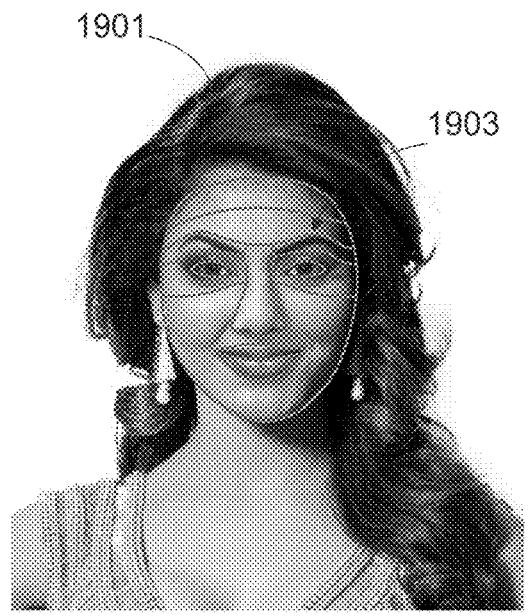
Figure 8:
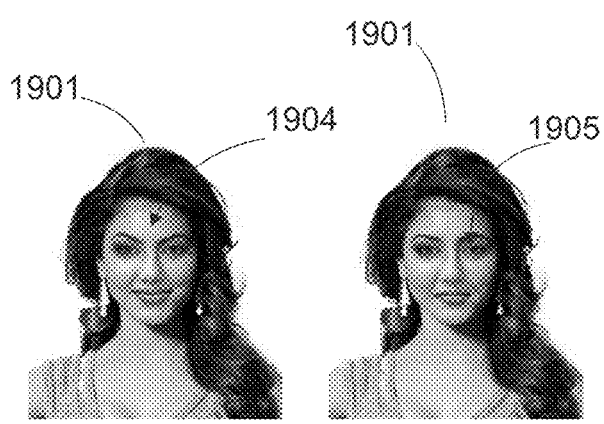
Figure 8:
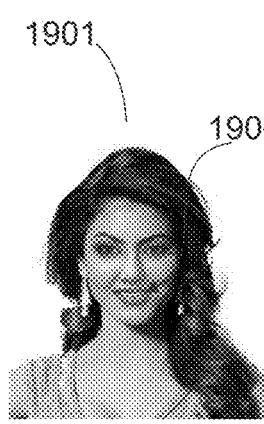
Figure 8:
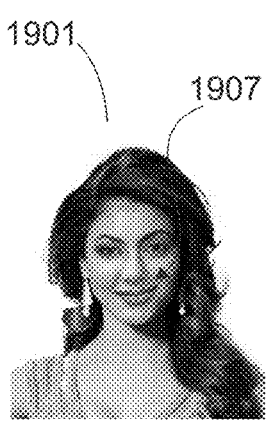

FIG. 8 illustrates an example of creating a movie scene by replacing a first face part in a body of a first character presented in a video with a second face part of a second character, and further creating different facial expressions too of the second face of second character different with the first face of the first character in a particular video frame. An image 901 is shown having the first character 902. Also, a video is shown having two frames 910, 920 at time t1 and t2, having a second character 903 and a third character 904. The second character 903 has two different facial expressions along with different body postures in both the frames 910 and 920. The two frames 910, 920, image 901, and other audio/text/video/instructions are processed to replace the first character 902 with the second character 903 to form two processed video frames 930 and 940, where the first character has different facial expressions with respect to the facial expressions of the second character 903 in the frames 910 and 920, but the same body postures as in the video frames 910 and 920. The face expressions of the first character 902 in the video frames 930 and 940 are based on audio/text/video/instructions provided as input. There are predetermined facial expressions related to audio/text/video/ instructions which are generated onto the face of the first character 902 in the processed video frames 930 and 940.

In an embodiment, the invention has an application in social media networking. An user of a social media can post an image with a text on his profile page, or may send an image with text on a chat to a receiver. The image gets processed into a video having realistic facial expression based on a face identified in the image and the text. The text here can be replaceable by an audio. Even the text can be replaceable by another video where another face identified in the video get replaced by the face identified in the image to display at the receiver end a processed video having the face from the image having all realistic expressions of the face replaced from the video. All the examples and embodiments presented here are applicable to social media networking as well.

FIG. 9(a)-FIG. 9(b) illustrates the points showing facial feature on user face determined by processing the image using trained model to extract facial feature and segmentation of face parts for producing facial expressions while FIG. 10(c)-(f) shows different facial expression on user face produced by processing the user face.

FIG. 10(a)-FIG. 10(b) illustrates the user input of front and side image of face and FIG. 11(c) show the face unwrap produced by logic of making 3d model of face using front and side image of face.

FIG. 11(a)-FIG. 11(b) illustrates the face generated in different angle and orientation by generated 3d model of user face. Once the 3D model of face is generated then it can be rendered to produce face in any angle or orientation to produce user body model in any angle or orientation using other person's body part/s image in same or similar orientation and/or angle.

FIG. 12 is a simplified block diagram showing some of the components of an example client device 1612. By way of example and without limitation, client device is a any device, including but not limited to portable or desktop computers, smart phones and electronic tablets, television systems, game consoles, kiosks and the like equipped with one or more wireless or wired communication interfaces. 1612 can include memory interface, data processor(s), image processor(s) or central processing unit(s), and peripherals interface. Memory interface, processor(s) or peripherals interface can be separate components or can be integrated in one or more integrated circuits. The various components described above can be coupled by one or more communication buses or signal lines.

Sensors, devices, and subsystems can be coupled to peripherals interface to facilitate multiple functionalities. For example, motion sensor, light sensor, and proximity sensor can be coupled to peripherals interface to facilitate orientation, lighting, and proximity functions of the device.

As shown in FIG. 14, client device 1612 may include a communication interface 1602, a user interface 1603, a processor 1604, and data storage 1605, all of which may be communicatively linked together by a system bus, network, or other connection mechanism.

Communication interface 1602 functions to allow client device 1612 to communicate with other devices, access networks, and/or transport networks. Thus, communication interface 1602 may facilitate circuit-switched and/or packet-switched communication, such as POTS communication and/or IP or other packetized communication. For instance, communication interface 1602 may include a chipset and antenna arranged for wireless communication with a radio access network or an access point. Also, communication interface 1602 may take the form of a wireline interface, such as an Ethernet, Token Ring, or USB port. Communication interface 1602 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 102 Furthermore, communication interface 1502 may comprise multiple physical communication interfaces (e.g., a Wifi interface, a BLUETOOTH® interface, and a wide-area wireless interface).

Wired communication subsystems can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

User interface 1603 may function to allow client device 1612 to interact with a human or non-human user, such as to receive input from a user and to provide output to the user. Thus, user interface 1603 may include input components such as a keypad, keyboard, touch-sensitive or presence-sensitive panel, computer mouse, joystick, microphone, still camera and/or video camera, gesture sensor, tactile based input device. The input component also includes a pointing device such as mouse; a gesture guided input or eye movement or voice command captured by a sensor, an infrared-based sensor; a touch input; input received by changing the positioning/orientation of accelerometer and/or gyroscope and/or magnetometer attached with wearable display or with mobile devices or with moving display; or a command to a virtual assistant.

Audio subsystem can be coupled to a speaker and one or more microphones to facilitate voice-enabled functions, such as voice recognition, voice replication, digital recording, and telephony functions.

User interface 1603 may also be configured to generate audible output(s), via a speaker, speaker jack, audio output port, audio output device, earphones, and/or other similar devices, now known or later developed. In some embodiments, user interface 1603 may include software, circuitry, or another form of logic that can transmit data to and/or receive data from external user input/output devices. Additionally or alternatively, client device 112 may support remote access from another device, via communication interface 1602 or via another physical interface.

I/O subsystem can include touch controller and/or other input controller(s). Touch controller can be coupled to a touch surface. Touch surface and touch controller can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface. In one implementation, touch surface can display virtual or soft buttons and a virtual keyboard, which can be used as an input/output device by the user.

Other input controller(s) can be coupled to other input/control devices, such as one or more buttons, rocker switches, thumb-wheel, infrared port, USB port, and/or a pointer device such as a stylus. The one or more buttons (not shown) can include an up/down button for volume control of speaker and/or microphone.

The computer system can include clients and servers. A client and server are generally remote from each other and typically interact through a network. The relationship of client and server arises by virtue of computer programs running on the respective computers and having a client-server relationship to each other.

One or more features or steps of the embodiments can be implemented using an Application Programming Interface (APT). An API can define on or more parameters that are passed between a calling application and other software code (e.g., an operating system, library routine, function) that provides a service, that provides data, or that performs an operation or a computation.

Processor 1604 may comprise one or more general-purpose processors (e.g., microprocessors) and/or one or more special purpose processors (e.g., DSPs, CPUs, FPUs, network processors, or ASICs).

Data storage 1605 may include one or more volatile and/or non-volatile storage components, such as magnetic, optical, flash, or organic storage, and may be integrated in whole or in part with processor 1604. Data storage 1605 may include removable and/or non-removable components.

In general, processor 1604 may be capable of executing program instructions 1607 (e.g., compiled or non-compiled program logic and/or machine code) stored in data storage 1505 to carry out the various functions described herein. Therefore, data storage 1605 may include a non-transitory computer-readable medium, having stored thereon program instructions that, upon execution by client device 1612, cause client device 1612 to carry out any of the methods, processes, or functions disclosed in this specification and/or the accompanying drawings. The execution of program instructions 1607 by processor 1604 may result in processor 1604 using data 1606.

By way of example, program instructions 1607 may include an operating system 1611 (e.g., an operating system kernel, device driver(s), and/or other modules) and one or more application programs 1610 installed on client device 1612 Similarly, data 1606 may include operating system data 1609 and application data 1608. Operating system data 1609 may be accessible primarily to operating system 1611, and application data 1608 may be accessible primarily to one or more of application programs 1610. Application data 1608 may be arranged in a file system that is visible to or hidden from a user of client device 1612.

FIG. 13 illustrate the device connected to the network.
FIG. 14 illustrate an embodiment of present invention.
FIG. 15 illustrate an embodiment of present invention.
FIG. 16 illustrate an embodiment of present invention.
FIG. 17 illustrate an embodiment of present invention.

The invention claimed is:

1. A method for generating visual sequences using a photo, comprising:
receiving the photo showing at least a face of a person,
receiving a message to be enacted by the person, wherein the message comprises at least a text, or voice, or an emotional and movement command, or a combination thereof,
processing the message to extract or receive audio data, and facial movement data related to an expression to be carried on the face of the person,
processing the photo, the audio data, and the facial movement data, and generating an animation of the person enacting the message,
wherein the emotional and movement command is a graphical user interface (GUI) instruction or multimedia-based instruction to invoke the generation of one or more facial movement and/or one or more body parts movement,
wherein a trained model is utilized to make lips of the person in the photo move in synchronization with the expression to be carried on the face of the person, and
wherein the trained model is generated using lots of faces using video/animation, or image/video of animation of other characters, or a combination thereof.

2. The method according to claim 1, wherein the message is received as an input from a user.

3. The method according to claim 2, wherein the message comprises the audio data.

4. The method according to the claim 1, wherein the message comprises a body movement instruction related to movement of body part/s of the person.

5. The method according to the claim 1 comprises:
processing the message and the audio data to producing a lip sync data;
processing, the one or more images, the audio data, the facial movement data, the lip sync data and generating an animation of the person enacting the message with lip sync.

6. The method according to the claim 1, wherein the images comprises faces of more than one person, the method comprising:
receiving messages to be enacted by a person in an order,
processing the messages to extract or receive the audio data related to voice of the persons, and the facial movement data related to expressions to be carried on faces of the persons,
processing, the one or more images, the audio data, and the facial movement data, and generating an animation of the person enacting the messages in the respective order as provided.

7. The method according to the claim 1, wherein the images comprises faces of more than one person, the method comprising:
receiving a selection input to select one or more persons with one or more faces from the one or more images received,
generating a scene image showing the one or more persons with one or more faces based on the selection input,
processing, the scene image, the audio data, and the facial movement data, and generating an animation of more than one person enacting the message.

8. The method according to the claim 1 comprises:
receiving a chat request made by an user with at least one another user,
establishing a chat environment between the users based on the chat request,
receiving at least one image representative of at least one of the users, wherein the image comprising at least one face,
receiving a message from at least one of the users in the chat environment, wherein the message comprises at least a text or a emotional and movement command.

9. The method according to claim 8, wherein the message from a first computing device is received at a second computing device, and processing the one or more images, the audio data, and the facial movement data, and generating an animation of the person enacting the message in the chat environment.

10. The method according to the claim 9, wherein the images comprise faces of more than one person, the method comprising:
receiving at least one image representative of more than one users in the chat environment,
processing the at least one image, and generating a scene image showing the users in the chat environment,
processing the scene image, the audio data, and the facial movement data, and generating an animation of more than one person enacting the message in the chat environment.

11. The method according to the claim 1 comprising:
receiving a wearing input related to a body part of the person in the one or more images onto which a fashion accessory is to be worn;
processing the wearing input and identifying one or more body parts of the person onto which the fashion accessory is to be worn;
receiving an image or video of the accessory according to the wearing input;
processing the identified one or more body parts the person and the image or video of the accessory and generating a wearing image showing the person wearing the fashion accessory,
processing the wearing image, the audio data, and the facial movement data, and generating an animation of the person enacting the message wearing the fashion accessory.

12. The method according to the claim 1 comprising:
receiving a target image showing a face of another person or animal,
processing the one or more images of the person and the target image to generate a morphed image showing the face from the target image on the person's body from one of the image of the person,
processing the morphed image, the audio data, and the facial movement data, and generating an animation of the person enacting the message.

13. The method according to the claim 1, comprising:
receiving a target image/video showing a body of another person or toon or animal,
processing the one or more person images, the target image or video, the audio data, and the facial movement data, and generating an animation of the person with the body of another person or toon or animal from the target image or video enacting the message.

14. The method according to the claim 1, the method is being implemented in a video call environment between at least two callers without using video camera by at least one of the callers, the method comprising:
receiving an image of the caller who is not using the video camera,
receiving a message to be enacted by the caller who is not using the video camera, wherein the message comprises at least the text or the emotional and movement command,
processing the message to extract or receive an audio data related to voice of the caller who is not using the video camera, and a facial movement data related to expression to be carried on face of the caller who is not using the video camera,
processing the image, the audio data, and the facial movement data, and generating an animation of the caller, who is not using the video camera, enacting the message,
Wherein emotional and movement command is a GUI or multimedia based instruction to invoke the generation of facial expressions and/or the body parts movement.

15. The method for generating the visual sequences according to claim 1, the method further comprising:
receiving a video showing at least a face of a second person,
receiving a second message to be enacted by the second person, wherein the second message comprises at least a text, or voice, or an emotional and movement command, or a combination thereof,
processing the second message to extract or receive audio data, and facial movement data related to an expression to be carried on the face of the second person,
processing the video, the audio data extracted or received from the second message, and the facial movement data extracted or received from the second message, and generating an animation of the second person enacting the second message,
wherein the emotional and movement command comprised in the second message is a GUI instruction or multimedia-based instruction to invoke the generation of one or more facial movement and/or one or more body parts movement,
wherein a trained model is utilized to make lips of the second person in the video to move in synchronization with the expression to be carried on the face of the second person, and
wherein the trained model is generated using lots of faces using video/animation, or image/video of animation of other characters, or a combination thereof.

* * * * *